Figure 1:
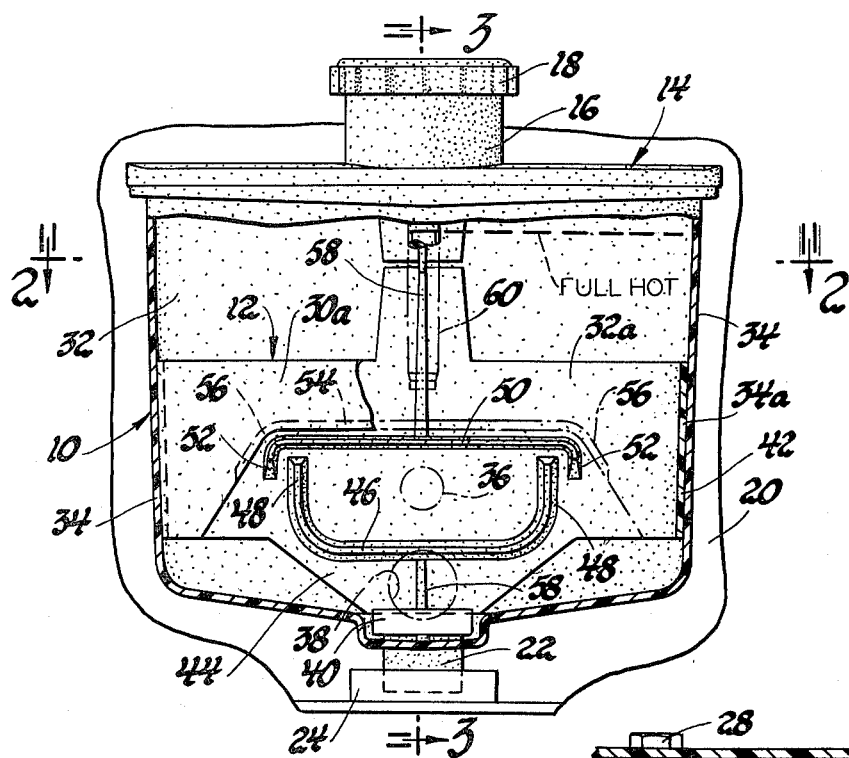

United States Patent [19]

Millington et al.

[11] 4,424,829

[45] Jan. 10, 1984

[54] VEHICLE FLUID POWER SYSTEM RESERVOIR

[75] Inventors: Donald L. Millington, Farmington Hills; Gerald A. Nyquist, Troy, both of Mich.

[73] Assignee: General Motors Corporation, Detroit, Mich.

[21] Appl. No.: 367,456

[22] Filed: Apr. 12, 1982

[51] Int. Cl.³ .............................................. E01B 11/00
[52] U.S. Cl. ................................... 137/590; 137/574; 137/576; 220/22
[58] Field of Search ............... 220/22, 86 R; 137/574, 137/576, 590

[56] References Cited

U.S. PATENT DOCUMENTS

| | | | |
|---|---|---|---|
| 3,621,773 | 11/1971 | Limberger et al. | 137/576 |
| 3,642,086 | 2/1972 | Andrews | 220/22 |
| 4,185,750 | 1/1980 | Op den Camp | 220/22 |
| 4,210,176 | 6/1980 | Emming | 137/574 |

Primary Examiner—A. Michael Chambers
Attorney, Agent, or Firm—Dean L. Ellis

[57] ABSTRACT

A reservoir vessel intended for storage of a small volume of reserve fluid in an automobile for a remotely located power steering or like system connected with the reservoir by flexible hoses and including a baffle structure for redirecting the incoming high velocity flow from the system to mix within the reservoir without undue turbulence and air entrainment.

4 Claims, 4 Drawing Figures

VEHICLE FLUID POWER SYSTEM RESERVOIR

This invention relates to vehicle fluid power systems and more particularly to an improved reservoir therefor.

The modern trend in vehicle design, front wheel drive and otherwise, creates even further premium on space in engine compartments, and a corresponding emphasis in redesigning engine-related accessories. In power steering and like fluid power systems, it is now often desirable to separate the fluid reservoir from what formerly had been unitary association with a submerged engine-driven pump, and rather to situate it remote from the engine and connect it to the steering gear and pump by flexible hoses. However, it is also desirable to shape the reservoir suitably to available space, and further ensure against the undue turbulence and entrainment of air in the fluid within the reservoir that can easily arise from the high entering flow velocities associated with the popular use of small diameter flex hoses. Such air entrainment affects the fluid viscosity and thus the efficiency of the fluid system.

The present invention provides a reservoir that is small in volume and space efficient, yet avoids undue amounts of such turbulence. Fluid entering the reservoir at high velocity through the hose from the fluid power system is redirected smoothly and efficiently in ways to avoid turbulence. Any air-entrained fluid is permitted to rise to regions remote from the reservoir outlet which feeds the fluid system.

The invention features a box-like vessel, which may be of even quite flat rectangular cross section for engine compartment space advantage. An inlet is provided in one wall at an angle to direct the incoming high velocity fluid from the hose against the opposite wall and then through a series of baffles. The baffles include webs overlapping each other to partition the inlet region from the region of a fluid outlet spaced from the inlet near the bottom of the vessel or otherwise. Intermediate these regions flow is routed via the baffle webs and via a series of overlapping and angled flanges of such baffles which define flow redirection channels. High velocity incoming fluid flow is caused to circulate to regions of the fluid body remote from the outlet region and mix therein at lower velocities prior to exiting the fluid outlet. Undue turbulence is avoided and oil frothing or air entrainment minimized. As a further feature, the baffling further can be constructed such that in more aggravated cases of high inlet velocity, or due to vessel shape, etc., whatever air entrainment that might occur can dissipate to upper margins of the body of fluid away from the mixing regions and the fluid outlet.

Figure 2:
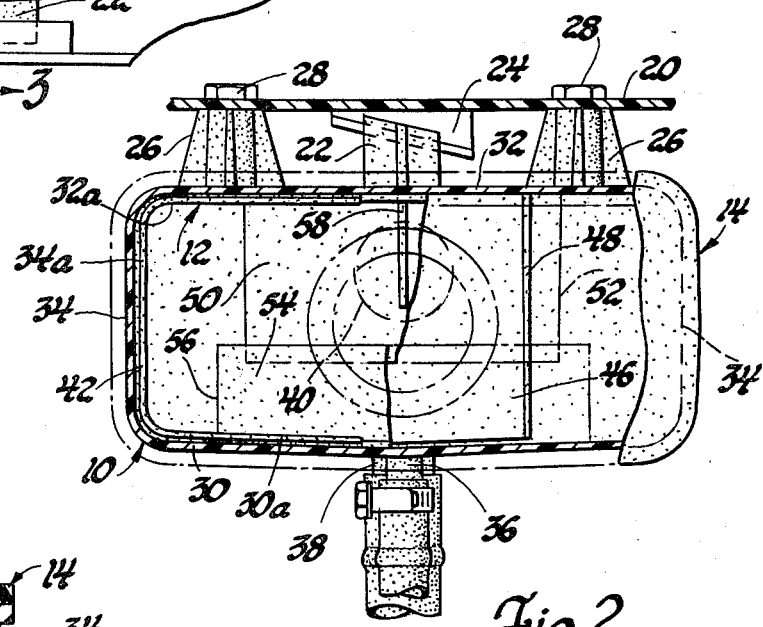
Figure 3:
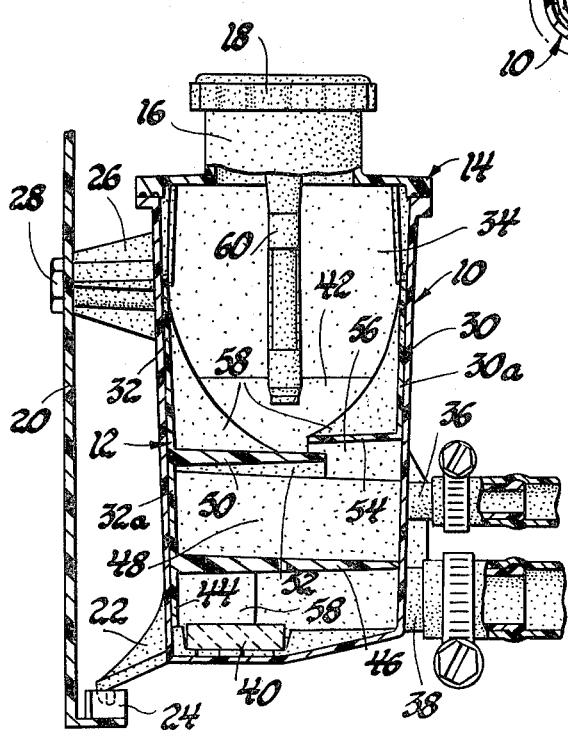
Figure 4:
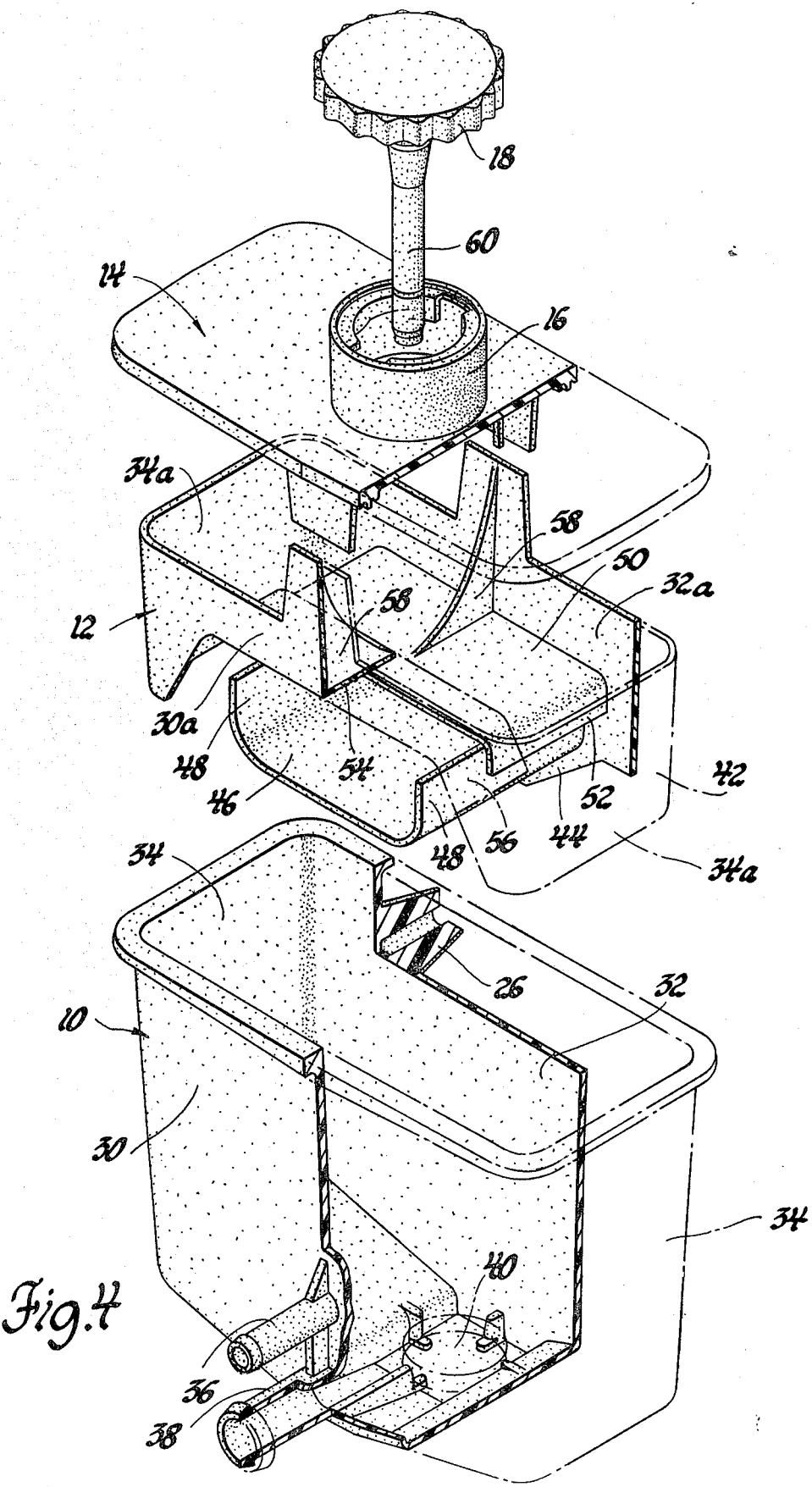

These and other objects, features and advantages of the invention will be apparent from the following specification and from the drawings wherein:

FIG. 1 is a partially broken away elevational view of a reservoir according to this invention mounted on a wall of a vehicle engine compartment, FIG. 2 is a sectional view taken generally along the plane indicated by lines 2—2 in FIG. 1, FIG. 3 is a sectional view taken generally along the plane indicated by line 3—3 of FIG. 1, and FIG. 4 is a broken away perspective view with parts exploded.

Referring now first to FIG. 4 of the drawings, the reservoir of the present invention is believed best embodied as an assembly of multiple parts each injection molded of a suitable structural polymer chosen to withstand the environmental conditions of the vehicle engine compartment, such conditions including high temperature, vibration, etc. A glass filled nylon has been found satisfactory. We separate the parts for efficiency in molding but it will be apparent as the description proceeds that it is not intended that the general features of the invention may not be accomplished otherwise, perhaps in the interest of eliminating assembly steps. In the present embodiment, the reservoir generally includes the vessel body designated as 10, a baffle structure insert 12, and a cover subassembly 14 including a fill neck 16 and a cap 18.

Referring now more particularly to FIG. 1, the reservoir is mounted upon a vertical panel 20 at a location in the vehicle engine compartment chosen to meet the conditions mentioned hereinabove, the vessel body 10 including an integral lower supporting tab 22 received in a similar tab conformation 24 of the vehicle wall 20. The vessel body 10 also includes an upper pair of molded stud bosses 26 suitably bored to receive self-tapping threaded fasteners 28 in apertures of the wall 20. In the instant embodiment, the vessel body is of flat rectangular conformation to enhance fitting it within the vehicle and includes a closely spaced first pair of generally vertical walls 30 and 32 and substantially spaced side walls 34. Front wall 30 includes an integrally formed inlet nipple or tube 36 and immediately therebelow a larger outlet nipple or tube 38. The bottom of vessel body 10 is generally symmetrically sloped and in its mid-region includes a depressed cavity sized to receive a ceramic magnetic disc 40. Such disc serves to attract and adhere metallic particles that may become entrained in the fluid of the hydraulic power system free of the effects of flow adjacent the inlet nipple 36.

In accordance with the invention, we separate inlet flow from the outlet nipple 38 by a baffle system in baffle structure 12 oriented with respect to the axis of inlet nipple 36. Referring to FIGS. 1 and 4, such baffle structure includes a closed figure generally rectangular outer wall 42 closely fitting the inner surface of the vessel body 10, and accordingly its portions are identified with suffexed numerals corresponding with the walls of the vessel body. Thus, the baffle structure includes front and back walls 30a and 32a and side walls 34a. A back wall portion 32a includes a depending segment 44 which seats upon the bottom wall of the vessel body 10. A first or lower baffle 46 extends horizontally generally the entire distance between walls 30a and 32a and includes a main web terminating in right-angularly upwardly turned flanges 48. When assembled, this lower baffle of baffle structure 12 lies vertically between the inlet and outlet nipples 36 and 38 to block fluid flow from occurring directly therebetween. Above such baffle a further horizontal baffle 50 extends from the back wall 32a the greater portion of the distance toward front wall 30a to overlap most of the baffle 46. It too includes a generally horizontal main web and terminates in right-angularly downwardly turned flanges 52 overlapping flanges 48. A third baffle 54 extends part of the distance from front wall 30a above baffle 50 toward back wall 32a to partially overlap both of the lower two baffles. Baffle 54 also includes a main horizontal web terminating in flanges 56 turned roughly 60° from the horizontal. Each of such baffles 46, 50 and 54 include a stiffening web such as 58 formed integrally with one of the two walls 30a or 32a from which the respective baffle extends, best seen in FIG. 3.

The cover 14 is sized and shaped to closely conform with the mouth of the vessel body 10 and to be joined thereto as by friction welding. The fill neck 16 and cap 18 are of conventional construction, the cap including an integral dipstick 60 with fluid level markings embossed thereupon. In FIG. 1, the "Full" level contemplated for this vessel is indicated with broken lines. The air cavity thereabove is vented to atmosphere via a port in the hollow stem in dipstick 60 communicated with shallow grooves in the undersurface of cap 18.

Referring to FIGS. 1 and 3, the incoming high velocity fluid at nipple 36 is directed on a generally horizontal axis to impinge directly upon the back wall 32a. The flow is there turned and must exit via flow redirection channels defined at each lateral set of flanges 48 and 52, i.e., the gap defined therebetween. The downwardly turned flanges 52 are structured with tapering wall thickness, or draft, as seen best in FIG. 2. So too are the flanges 48 and the result is that the flow redirection channel or gap therebetween at each side of baffle 46 is increasingly wider as the flow turns from back wall 32a and proceeds toward front wall 30a. We theorize that a metering of flow thereby occurs such that flow volume is more uniformly distributed over the entire depth of the redirection channels all as an aid to minimizing localized turbulence in the fluid mixing that occurs below these channels with the main fluid body.

It is seen in FIG. 1 that the mixing of incoming fluid provided by the baffles 46 and 50 takes place in regions laterally spaced from outlet nipple 38. Dissipation of kinetic energy of the incoming fluid may occur in these regions prior to exit of such fluid through the outlet nipple. Whatever air bubbles that may have been entrained and carried to these laterally spaced regions can be dissipated by rise thereof unimpeded by any baffles to the upper region of the fluid body.

Such rise of lighter air entrained fluid is believed aided by the flow circulation pattern established in the laterally spaced mixing regions via the redirection channels. The generally right angular flanges 48 and 52 have been thus conformed with respect to their proximity to side walls 34 and 34a to achieve best results in anti-turbulent flow as was established in testing. Differing relations of such proximity or even shape of such side walls could result in different best conformations of such flanges 48 and 52.

We have found that in some aggravated cases of high incoming fluid velocity, or due to different shapes of baffle flanges or angles thereof, the overall scheme of this baffle structure could involve some trapping of air bubbles in the cavity between baffles 46 and 50 opposite the inlet. With the particular embodiment illustrated, escape and routing of such lighter air-entrained fluid to the higher regions of the fluid body is done by limiting the horizontal depth of baffle 50 to terminate well short of front wall 30 and by overlapping the third baffle 54 thereover. This provides a further flow redirection channel or gap for the escape of this lighter fluid.

Referring to FIG. 3, the overlap of baffle 54 is preferably short, and the gap to baffle 50 is also narrow. In FIG. 1, the gap extends uniformly the full width of the main web of baffle 54. Thus, the flanges 56 serve as extensions of flanges 52 to direct higher energy flow downwardly into lateral mixing regions in the same manner as the redirection channels, while ligher air-entrained fluid may turn rearwardly to escape in the further redirection channel between the webs of baffles 50 and 54 and rise upwardly thereafter.

The embodiments of the invention in which an exclusive property or privilege is claimed are defined as follows:

1. A small volume, low turbulence reservoir for a hydraulic power system comprising, a vessel having a first wall defining an inlet opening therein on an axis, a wall opposite said first wall generally perpendicular to said axis extended and subjected to high velocity fluid flow from said inlet, an outlet in said vessel body, a first baffle extending between said vessel walls and separating said inlet and said outlet, said first baffle having a main web generally centered on a plane through said axis and terminating with turned lateral flanges each located substantially away from said outlet, and a second baffle above said inlet having a main web disposed generally parallel the web of the first baffle terminating with turned lateral flanges outside the first baffle flanges generally parallel with and overlapping same to define therewith fluid flow redirection channels, whereby high velocity fluid entering from said inlet flows in directions laterally of the inlet axis and through said flow redirection channels enabling lower velocity mixing with the body of fluid contained in said vessel in regions spaced from said outlet.

2. In a vehicle hydraulic power system, a small volume, low turbulence reservoir, comprising, a reservoir vessel, means mounting said vessel in the vehicle engine compartment, said vessel having a first generally vertical wall defining an inlet opening therein on an axis, a wall opposite said first wall generally perpendicular to said axis extended and subjected to high velocity fluid flow from said inlet, an outlet in said vessel body located below said inlet, a first baffle extending generally horizontally between said vessel walls and located vertically between said inlet and said outlet, said first baffle having a main horizontal web generally centered on a plane through said axis and terminating with upwardly directed lateral flanges each located substantially away from said outlet, and a second baffle above said inlet having a main web disposed generally parallel the web of the first baffle merging with downwardly directed lateral flanges outside the first baffle flanges generally parallel with and overlapping same to define therewith fluid flow redirection channels, whereby high velocity fluid flow entering from said inlet flows in directions laterally of the inlet axis and downwardly through said flow redirection channels enabling lower velocity mixing with the body of fluid contained in said vessel and rise of any air entrained fluid in regions spaced laterally from said outlet.

3. In a vehicle hydraulic power system, a small volume, low turbulence reservoir, comprising, a reservoir vessel, means mounting said vessel in the vehicle engine compartment, said vessel having a first wall defining an inlet opening therein on an axis, a second wall opposite said first wall generally perpendicular to said axis extended and subjected to high velocity fluid flow from said inlet, an outlet in said vessel body spaced from said inlet, a first baffle extending generally horizontally between said vessel walls and located vertically between said inlet and said outlet, said first baffle having a main horizontal web generally centered on a plane through said axis and terminating with turned lateral flanges each located substantially away from said outlet, a second baffle above said inlet extending from said second wall a part of the distance toward the first wall and having a main web disposed generally parallel the web of the first baffle, said second baffle terminating with turned lateral flanges outside the first baffle flanges generally parallel with and overlapping same to define therewith fluid flow redirection channels, and a third baffle above said second baffle extending from said first wall part of the distance to said second wall defining a further flow redirection channel, whereby high velocity fluid flow entering from said inlet flows in directions laterally of the inlet axis and through said flow redirection channels enabling lower velocity mixing with the body of fluid contained in said vessel and rise of any air entrained fluid in regions spaced from said outlet.

4. In a vehicle hydraulic power system a small volume, low turbulence reservoir, comprising, a reservoir vessel, means mounting said vessel in the vehicle engine compartment, said vessel being of generally rectangular cross section and including a first pair of generally vertical walls relatively proximate one another and a second pair of side walls oriented generally vertically and spaced substantially apart, an inlet opening defined in one of said first pair of walls receiving incoming high velocity fluid flow and directing same generally horizontally against the other of said first pair of walls, an outlet in said first of said pair of walls located below said inlet, a first baffle wall extending generally horizontally between said first pair of vessel walls and disposed vertically between said inlet and said outlet, said first baffle wall having a main horizontal web generally centered on a plane through the axis of said inlet and terminating in upwardly directed lateral flanges each located proximate one of said vessel side walls and substantially away from said outlet, a second baffle above said inlet having a main web disposed generally parallel the web of the first baffle terminating in downwardly directed lateral flanges, said second baffle extending from said other of said first pair of walls a part of the distance of said one of said pair of walls and said downwardly directed flanges both generally parallel with and overlapping the flanges of the first baffle to define therewith fluid flow redirection channels, a third baffle above the said second baffle extending from said one of said first pair of walls part of the distance toward said other of said pair of walls overlapping and closely proximate the second baffle to define a further flow redirection channel, said third baffle including a main web portion terminating in lateral flanges turned angularly downwardly and overlapping the downwardly turned flanges of said second baffle to provide a widened extension of the first mentioned flow redirection channels, whereby high velocity fluid entering from said inlet flows in directions laterally of the inlet axis through said first mentioned flow redirection channels and widened extensions thereof and through said further flow redirection channels upwardly enabling a lower velocity mixing with the body of fluid contained in said vessel and rise of any air entrained fluid in regions spaced from said inlet.

* * * * *